United States Patent [19]

Stein

[11] 4,137,522

[45] Jan. 30, 1979

[54] REMOTE CONTROL APPARATUS FOR A PLURALITY OF INDIVIDUALLY CONTROLLABLE OBJECTS

[75] Inventor: Hermann Stein, Munich, Germany

[73] Assignee: Steuerungstechnik GmbH, Munich, Germany

[21] Appl. No.: 829,311

[22] Filed: Aug. 31, 1977

[30] Foreign Application Priority Data

Sep. 1, 1976 [DE] Fed. Rep. of Germany ....... 2639363

[51] Int. Cl.[2] ............................................... H04Q 9/00

[52] U.S. Cl. ......................... 340/147 R; 340/147 SY; 340/147 LP; 340/168 R

[58] Field of Search ...... 340/147 R, 147 SY, 147 LP, 340/168 R

[56] References Cited

U.S. PATENT DOCUMENTS 3,820,070 6/1974 Fox ................................. 340/147 R

*Primary Examiner*—Harold I. Pitts

*Attorney, Agent, or Firm*—Hans Berman; Marianne Rich

[57] ABSTRACT

A plurality of individual control units transmits control signals, each to a corresponding controllable object. The control signals from the different units are arranged in a predetermined sequence, each control unit having a self-address which signifies its position in the sequence. The self-address is stored in the unit and transmitted in the control signal. Each unit has a receiver receiving the control signals from the other units and deriving an external address signal therefrom. The external address signal presets an address counter. After termination of the received control signal, pulses are added to the address counter until its counting output is equal to the self-address of the unit. The unit then transmits its control signal, but only if no new control signal is being received. Since the self-addresses increase as the position in the sequence increases, the presetting of the address counter causes units having a lower self-address than the preset number to be blocked. Self-address changing circuits are provided to allow incorporation of a unit or units into a different sequence.

28 Claims, 9 Drawing Figures

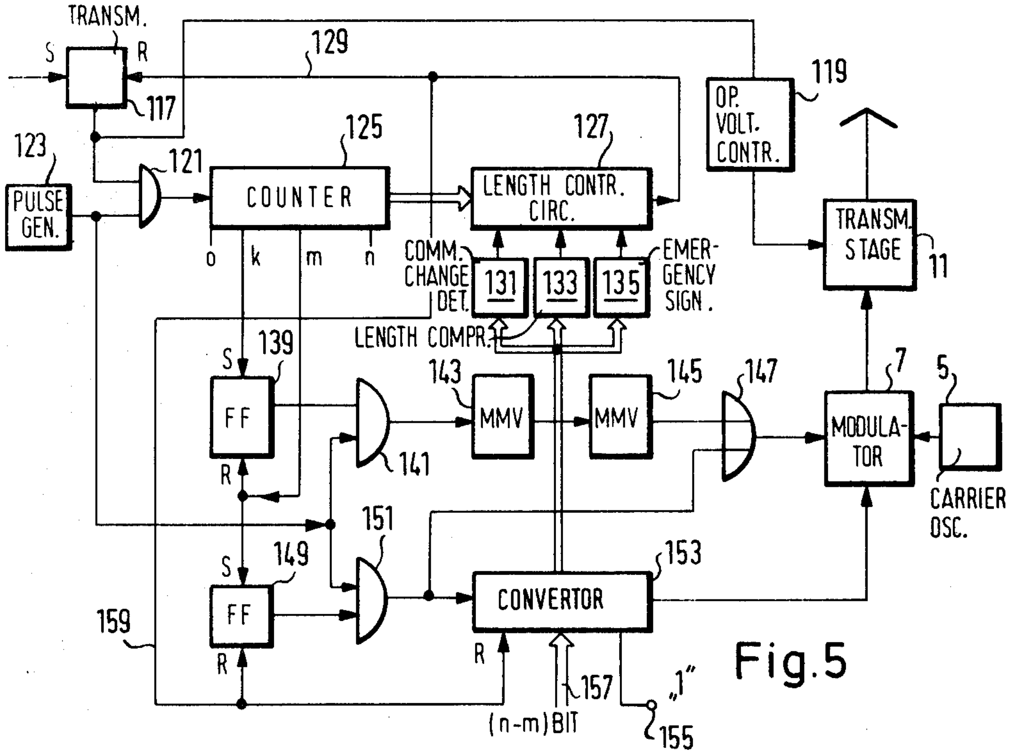
Fig.5
Fig. 6
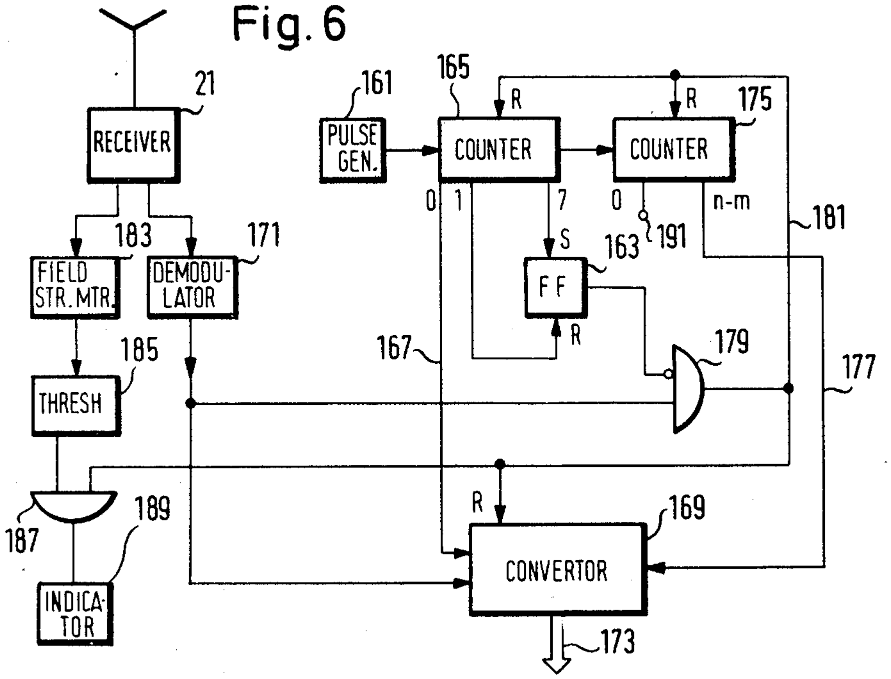

REMOTE CONTROL APPARATUS FOR A PLURALITY OF CONTROLLABLE OBJECTS

BACKGROUND OF THE INVENTION

This invention relates to apparatus for the wireless control of a plurality of controllable objects. More specifically, it relates to apparatus wherein an individual control unit is furnished for each of the objects but the control signals for all units are modulated in a predetermined sequence on to a high frequency carrier. Each control signal includes an address portion signifying the addressed object and a command portion which specifies the operation the object is to carry out.

Cranes, locomotives and other moveable or stationary objects are increasingly radio controlled by stationary or moveable individual control units. In order to avoid having a different carrier frequency for each object, apparatus has become known in which a plurality of independently operable objects can be controlled by control signals modulated on to a single high frequency carrier. German Offenlegungschrift 24-49-6660 discloses apparatus for the wireless control of a plurality of independently operable ojbects by means of control signals modulated in a predetermined time sequence on to a high frequency carrier. The control signals comprise an address portion signifying the addressed object and a command portion which signifies the operation to be carried out by the object. It also fixes the position within the raster of each control signal, that is it determines the sequence in which the individual control units transmit the control signals. This known arrangement has a disadvantage that gaps arise within the time raster if one or more of the individual control units become inactive. These gaps cannot be filled. The frequency with which the individual control units can transmit control signals is thus always determined by the maximum number of individual control units which may be incorporated into the time raster.

Other known apparatus is disclosed in German DT-AS-22-11-313 which also discloses apparatus for wireless control of a plurality of independently operable objects by means of individual control units. Each of the individual control units has a counter which is preset to a count signifying its position in the sequence. Each individual control unit further has a field strength detector which responds to control signals by the other units and enables all counters to count timing pulses when the control signal from another unit terminates. The first counter to reach its preset count is the one which transmits. A blocking circuit is provided to prevent transmission from any one unit more than once in the cycle. In this arrangement, gaps which arise can be filled by the subsequent units in the sequence. However, the overall cycle time is fixed because of the blocking circuit which prevents the individual unit from transmitting twice in a cycle. Further, new units which are activated for the first time or which assume radio contact with other individual control units for the first time are very difficult to incorporate into the sequence. Difficulties in synchronization arise which may cause the signal from the newly introduced individual control unit to be blocked indefinitely.

A further disadvantage of this known system is that residual time gaps arise in the sequence since each individual control unit must execute its full count following termination of the previous control signal, before being able to transmit.

SUMMARY OF THE INVENTION

It is an object of the present invention to furnish apparatus for remote control of a plurality of controllable objects wherein an individual control unit is furnished for each of these objects and the control signals of all units are modulated on the same high frequency carrier. The transmission sequence among the units is to be maintained and the remaining control units are to follow one another with minimal time gaps, even when individual control units are temporarily excluded from the sequence. Further, the apparatus is to operate in such a manner that additional control units can be incorporated rapidly and without loss of synchronism into the pre-existing sequence.

The present invention is apparatus for furnishing control signals in a predetermined sequence to a plurality of controllable objects, said apparatus comprising a plurality of individual control units, each for furnishing a control signal to a corresponding one of said objects. Each of the control signals has an address portion comprising a self-address signifying the position in said predetermined sequence of said control signal and a command portion signifying the operation to be carried out by the object. Each individual control units comprises first storage means for storing said self-address signal thereby furnishing a stored self-address signal and transmitting means connected to said first storage means for transmitting said control signal in response to a transmit enable signal. Each individual control unit further comprises receiving means for receiving control signals transmitted by the other of said individual control units, furnishing a blocking signal indicative of the presence of the received control signal and furnishing a corresponding external address signal. Second storage means are connected to the receiving means for storing said external address signal, thereby furnishing a stored external address signal. Each unit further has timing means connected to said receiving means, for furnishing a sequence of timing signals starting at a predetermined time instant following termination of reception of previous control signal. Enable means are connected to the first and second storage means and the timing means for receiving said timing signals and furnishing said transmit enable signal when the number of received timing signals corresponds to the difference between said stored external address signal and said stored self-address signal. Finally, blocking means are provided for blocking the furnishing of said transmit enable signal in response to said blocking signal, whereby transmission from all except the first enabled one of said individual control units following termination of reception of the previous control signal is blocked.

In a preferred embodiment of the present invention, the enable means comprises address modifying means connected to said timing means and said second storage means for modifying said stored external address signal in response to said timing signals and furnishing said transmit enable signal upon correspondence between the so-modified external address signal and said self-address signal.

In the above system each of said addresses is a number the value of each number being indicative of the position of said control signal in said sequence of control signals, and the timing means comprises pulse generator means for furnishing a sequence of timing pulses at a frequency substantially exceeding the rate of transmission of said control signals.

The present invention, both as to its construction and its method of operation, together with additional objects and advantages thereof, will best be understood from the following description of preferred embodiments when read in connection with the accompanying drawing.

Figure 1:
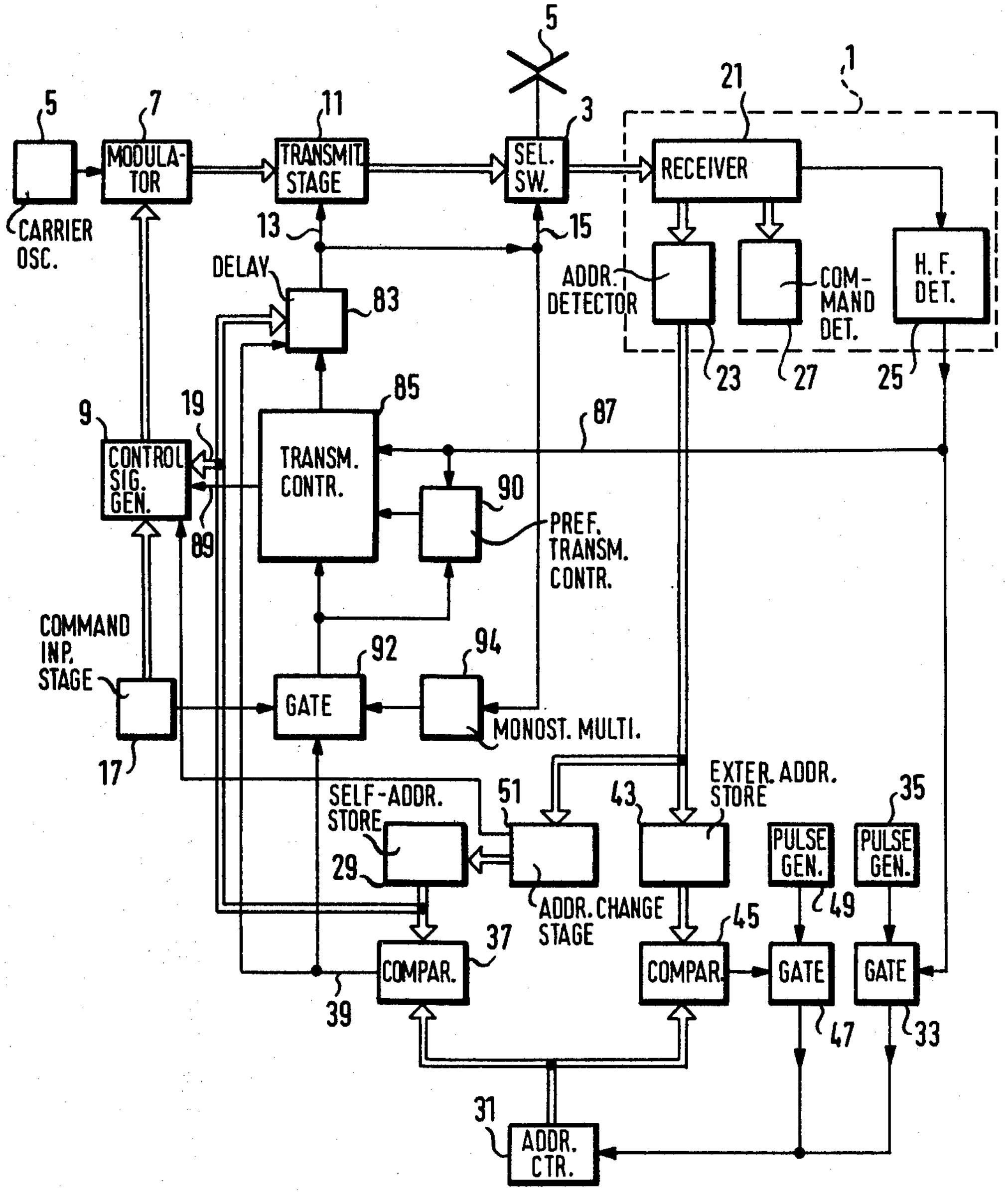
FIG. 1 is a block diagram of a preferred embodiment of an individual control unit according to the present invention.
Figure 2:
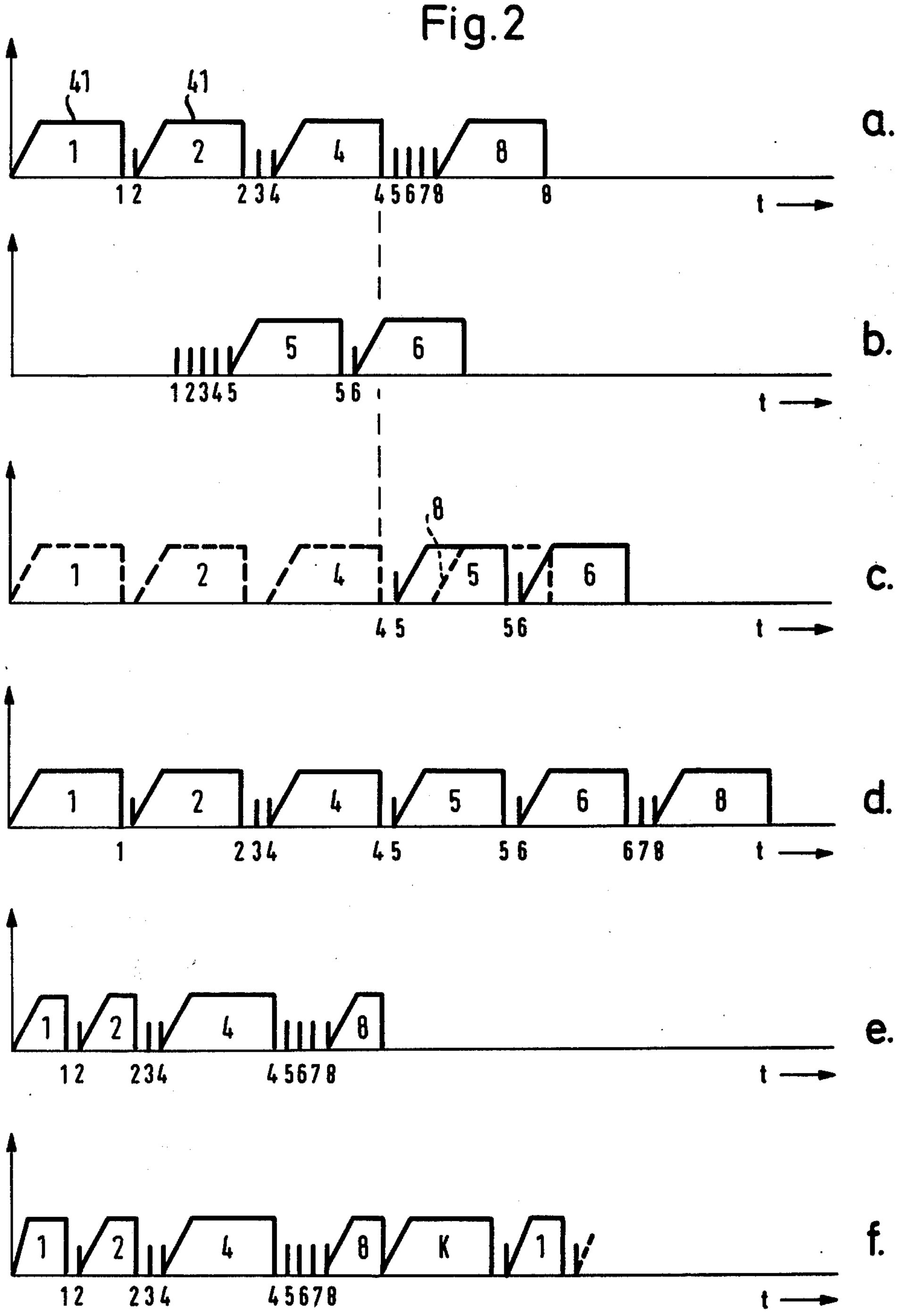
Figure 3:
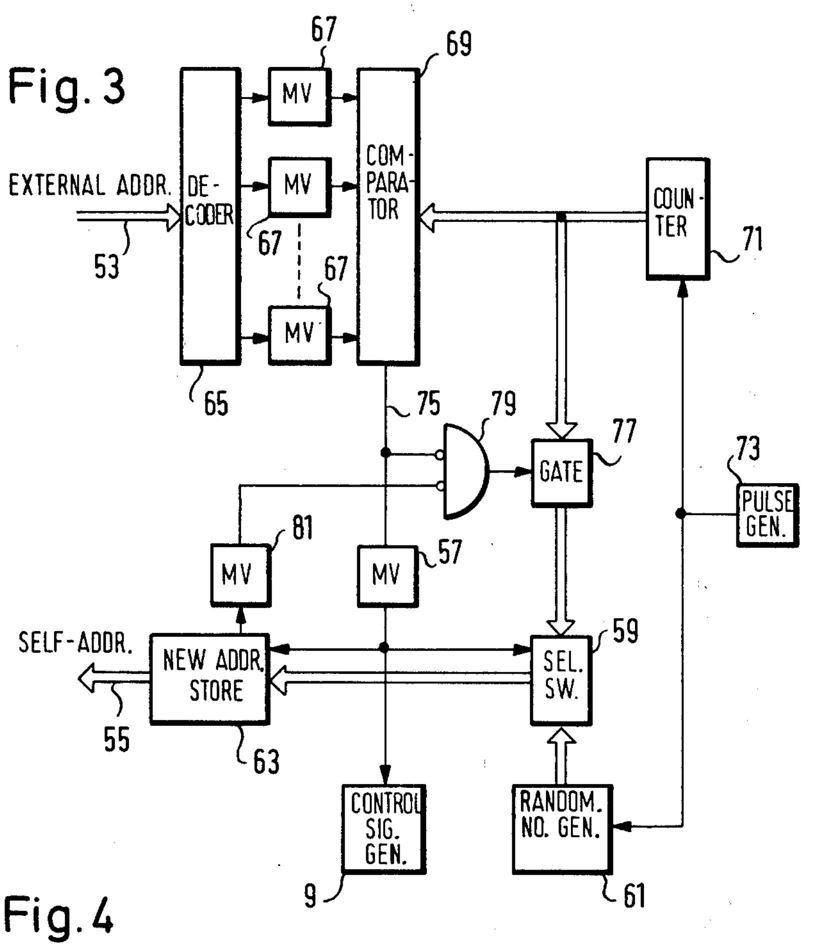
Figure 4:
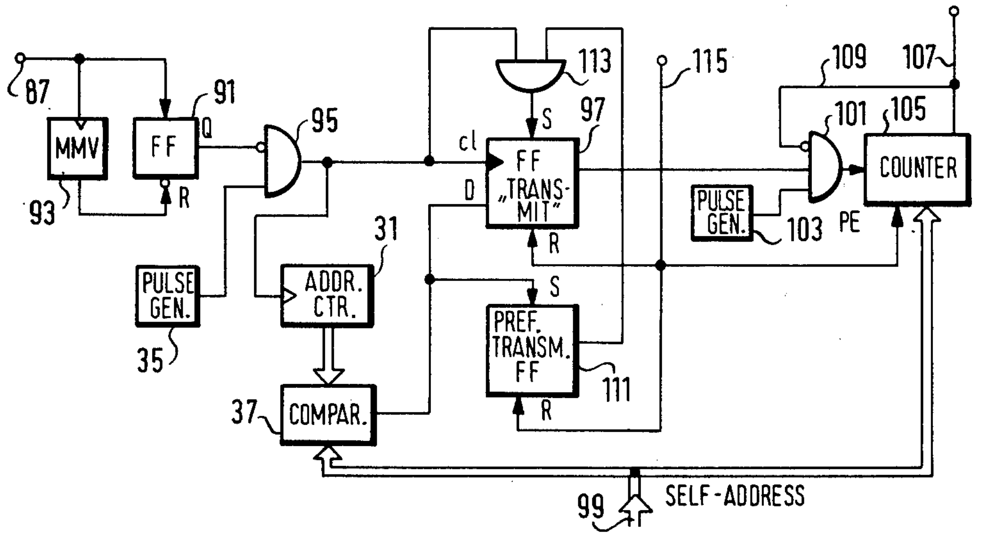
Figure 7:
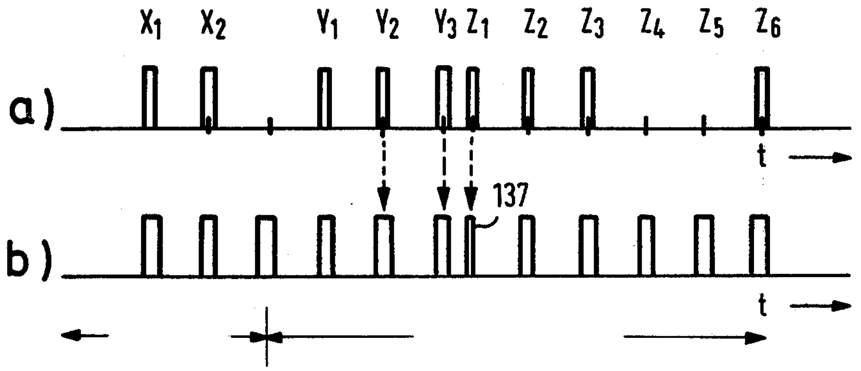
Figure 8:
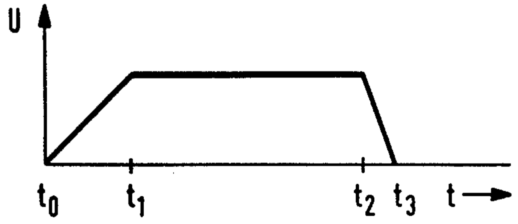
Figure 9:
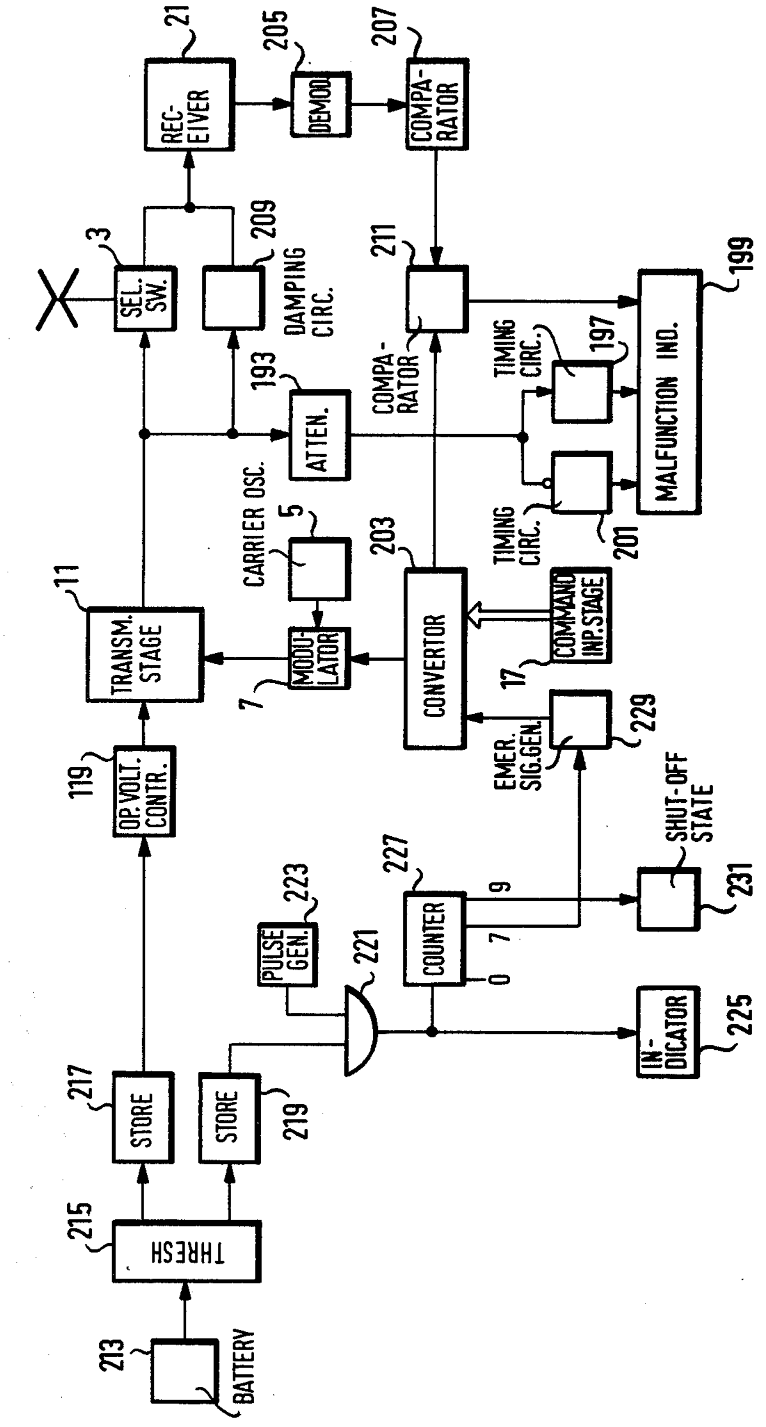

FIGS. *2a – f* are timing diagrams showing control and timing signals generated in the apparatus of FIG. 1;

FIG. 3 is a block diagram of apparatus for changing the self-address of an individual control unit;

FIG. 4 is a more detailed block diagram of the transmission control stage and the delay stage shown in FIG. 1;

FIG. 5 is a block diagram of the control signal generator of FIG. 1;

FIG. 6 is a more detailed block diagram of the receiving means of FIG. 1;

FIG. *7a, b* are timing diagrams illustrating the timing of the synchronizing pulses;

FIG. 8 is a timing diagram illustrating the variation of operating voltage applied to the transmitting stage during energization and de-energization;

and FIG. 9 is a block diagram of monitoring apparatus.

DESCRIPTION OF THE PREFERRED EMBODIMENT

In accordance with the present invention, the operation of the plurality of objects is to be controlled by control signals furnished by a plurality of individual control units, one for each of said objects. An object may, for example, be a crane or a locomotive. Each individual control unit transmits the control signal modulated onto a high frequency carrier, the type of modulation utilized being unimportant for the present invention. So that a plurality of objects can be controlled independently, but by control signals modulated unto the same carrier frequency, the individual control units transmit the control signals in a predetermined time sequence. Each control signal has an address portion which specifies not only the address of the object to be controlled, but also the position in the time sequence of the particular individual control unit. The control signal further comprises a command portion which includes the information required to specify the operation of the object. Each control signal further has synchronizing signals which synchronize the operation of the transmitting individual control unit with that of the inactive units and with that of the particular object being controlled.

Each object has receiving means which operates selectively only in response to signals having the address associated with the object.

An individual control unit is shown in block diagram form in FIG. 1. In the unit, receiving means 1, are normally connected through a selector switch 3 to a receiving/transmitting antenna *5a*. The transmitting means of the unit include a carrier oscilator 5 which is connected to a modulator, 7. The control signal, furnished by control signal generator, 9, is modulated onto the carrier signal in modulator 7. The so-modulated carrier signal is applied to the transmitting stage 11. When the unit is to transmit, a transmit enable signal on a line 13 enables transmitting stage 11 and, on a line 15, causes selector switch 3 to connect receiving/transmitting antenna *5a* to the output of stage 11. Control signal generator 9 combines the data furnished by a command input stage 7 with the address portion furnished on a line 19. Control signal generator 9, in a preferred embodiment, also adds the synchronizing signals to the control signal.

The receiving means 1 includes a demodulator stage 21 which demodulates the carrier signal and furnishes the control signal. An address separator stage 23 separates the address portion from the control signal while a command separator stage 27 separates the commands. This stage actually has no relevance to the individual control units and may be omitted. A stage 25 constitutes blocking means, that is, it responds to the presence of a received control signal (e.g. to the presence of the high frequency carrier) and furnishes a blocking signal throughout the time that a control signal is being received by the unit.

First storage means, 29, store the self-address of the unit, that is either the address contained in the control signal furnished by control signal generator 9 or that part of the address which specifies the time (position in the sequence of control signals) at which the individual control unit is to transmit its control signal. The self-address is a number which, in a preferred embodiment, increases with increases in the position in the sequence, that is, later transmitting units have higher self-address numbers.

An address counter 31 receives pulses from a timing signal generator 35. The frequency of pulses in the pulse sequence furnished by timing signal generator 35 is substantially higher, preferably by several multiples, than the frequency at which the control signals are transmitted. A transmission gate (first gating means), 33, is connected between timing signal generator 35 and address counter 31. Pulses from pulse generator 35 are transmitted to counter 31 only in the absence of a blocking signal, that is only if no control signal from another unit is being received. The number in address counter 31 is compared to the self-address in a comparator 37 and, when the two signals are equal, comparator 37 furnishes a signal on line 39 which, after some possible modification which will be discussed below, causes the unit to be switched to the transmitting state. The signal on line 39 is herein referred to as a first enable signal.

The external address stored in storage 43 is compared to the number in address counter 31. If the number in address counter 31 is less than the external address number, a gate 47 is opened which allows pulses from a pulse generator 49 to be applied to counter 31. The pulses from pulse generator 49 have a pulse repetition frequency which is substantially higher than the repetition frequency with which the control signals are being sent by the individual control unit. Address counter 31 is thus preset to the number corresponding to the last external address received by the unit. When the blocking signal on gate 33 is next removed, that is when the received control signal teminates, gate 33 starts transmitting pulses from pulse generator 35 to address counter 31, but the number of such pulses required until comparator 37 furnishes its output signal is decreased by the amount of the preset number. The time between the transmission of control pulses is thus decreased. Further, whenever the address counter of a unit is preset to a higher address than its self-address it automatically blocks any transmission from the unit, since comparator 37 cannot detect equality.

This is illustrated in FIG. *2a* which is a timing diagram showing one operating cycle of a sequence of control signals including control signals from four individual control units having, respectively, self-addresses 1, 2, 4 and 8. The control signals are shown as blocks 41 while the self-addresses are denoted by Arabic numerals within the blocks. The timing pulses furnished by timing signal generator 35 are shown as lines between the blocks. Thus, for example, the address counter associated with individual control unit 4 will be preset to the number "2" and, when control pulse 2 terminates only two additional pulses will be required from timing pulse generator 35 until the transmitting circuit of unit 4 is enabled by the output signal of its comparator 47.

Individual transmitting units as shown in the FIG. 1 can be incorporated into an existing sequence of other such units without any problems as will be illustrated with reference to FIG. *2b*.

FIG. *2b* shows a sequence of two individual control units, 5, 6 which are first assumed not to be in radio contact with the individual control units of FIG. *2a*. This may for example occur because units 5 and 6 have not been activated or have been too far distant from the other units to be in radio contact with them. If units 5 and 6 are now activated and are both simultaneously in radio contact with 1, 2, 4 and 8, then units 5 and 6 will be immediately incorporated into the sequence of FIG. *2a* and the sequence of FIG. *2d* will result.

Next, let it be assumed that unit 5 first assumes radio contact with unit 4 but that no radio contact exists to units 1, 2, 8 of the sequence of FIG. *2a* or between unit 6 and the latter sequence. As illustrated in FIG. *2c*, unit 5 will then be incorporated into the sequence of FIG. *2a* following unit 4. Unit 6 will of course follow unit 5 as it is in radio contact with that unit. Similarly unit 8 will still transmit its control signal following the transmission of a control signal from unit 4, since it is not in radio contact with either units 5 or 6. The starting time of the sequence of FIG. *2b* will therefore have been translated in time to a position where it may be incorporated into the cycle of *2a*, but a full incorporation into the latter sequence cannot occur until all units are in radio contact with each other.

Pulse generator 35 and gate 33 are herein referred to as address modifying means. The time interval which may elapse between receipt of control signals by any one object is limited by safety considerations. This time is in the order of approximately 550 milliseconds. It constitutes the maximum time available for a cycle, that is each control signal must be transmitted once within this time interval. If no control signal is received by the object until the maximum time interval has elapsed, the object will be deactivated. The number of individual control units which are to be in radio contact with each other, that is which are to be incorporated into any particular sequence should therefore be a minimum. It can be limited if, as will be explained below relative to FIG. 6, a threshold stage is included in the receiving apparatus of each individual control unit. The threshold stage will prevent the incorporation into the sequence of any individual control unit whose control signal has a field strength which, upon reception by the object, is sufficiently low that no interference will result. For example it may be assumed that no interference with reception will take place if the field strength of the control signals from units not associated with the object is less than 30% of the field strength of the individual control unit controlling the object. If it is to be assumed that the objects are generally located very closely to their corresponding individual control unit, for example within sight of such a unit, then the number of individual control units which must be incorporated into any sequence may be limited without decreasing the transmission power of any of the units.

The limiting of the range over which any of the individual control units become effective also lets the unit of the present invention be used for the control of objects which move over long distances and, during such movement, come into radio contact with different individual control units which are also arranged in predetermined sequences. An example of such an application is the remote control of trains. Since the sequence into which it may be incorporated may contain individual control units which have the same address as the unit associated with the moving object, each individual control unit contains address control means indicated by block 51 in FIG. 1. It is the function of the address control means to change the self-address of the unit so that it does not coincide with the self-address of the unit already within the sequence.

FIG. 3 shows a preferred embodiment of the address control means. Received external addresses, for example from the output of unit 23 are applied through a line 53 to a decoder 65. The new self-address is to be stored in an address storage 63 from which it can be transferred to self-address storage 29 of FIG. 1 through a line 55. The circuits shown in FIG. 3 will furnish, on line 55 only that portion of the address which determined the position in the sequence of the individual control unit. The portion of the address which denotes the object to be controlled must be separately supplied. For example, an individual address storage stage can be a part of control signal generator 9 of FIG. 1.

As long as no control signal is received, a monostable multivibrator 57 furnishes a "O" signal which causes a selector switch 59 to be in the position in which it connects address storage 63 to a random number generator 61. Random number generator 61 furnishes random numbers which are to used as the self-addresses of the individual control unit. Since the self-address of the unit is thus continually changing it cannot coincide for any length of time with the addresses of other individual control units which, as previously explained, prevents the incorporation of the individual control unit into a sequence.

It is desirable to prevent the individual control unit from transmitting the addresses specified by random number generator 61 in order that monostable multivibrators 67 of other control units (as will be described below) are not activated unnecessarily. For this purpose the output of monostable multivibrator 57 is also connected to control signal generator 9 of FIG. 1 and causes the addresses furnished by self-address storage 29 to be changed to a number which indicates that the self-addresses are changing randomly. Any number which is not recognized as an external address by decoder 65 can be chosen. For example the number "000" can readily be generated by resetting the address set into control signal generator 9 by self-address storage 29.

If, however, a control signal is received on line 53, decoder 65 furnishes an output signal which sets one of a plurality of monostable multivibrators 67. Each of these monostable multivibrators is assigned to a particular external address, the number of these multivibrators 67 thus being equal to the number of possible received addresses. Since multivibrators 67 are monostable, they reset automatically after a time period corresponding to their time constant. Thus, if the individual control unit which originally caused the monostable multivibrator to be set moves sufficiently far away so as to be excluded from the sequence, its address is automatically freed. The time constant of the monostable multivibrators can be such that each address is stored at least for several cycles of the control signals sequence. Which of the monostable multivibrators 67 stores an address is determined by means of a scanning comparator 69 which checks the state of the corresponding one of monostable multivibrators 67 in response to an address signal furnished by a scanning counter 71. Scanning comparator 69 operates as a multiplexer and interrogates a monostable multivibrator 67 for each external address furnished by scanning counter 71. Counter 71 is advanced by a pulse generator 73. As soon as comparator 69 finds a coincidence between a set multivibrator 67 and a number furnished by counter 71, it furnishes "1" at its output 75. This signal sets a monostable multivibrator 57. Monostable multivibrator 57 has a time constant of several cycles. A "1" signal at its output indicates that at least one other individual control unit is transmitting a control signal and that therefore a time sequence is to be established. The "1" output of monostable multivibrator 57 also switches selector switch 59 to the position wherein the new address storage 63 is connected through a gate 77 to scanning counter 71. Gate 77 is controlled by the output of an AND gate 79 which has two inverting inputs. The first inverting input is connected to the output of scanning comparator 69, while the second input is connected to the output of a monostable multivibrator 81. Monostable multivibrator is set when a new address is read into storage 63. The output of monostable multivibrator 81 thus blocks gate 77 for a predetermined time interval following receipt of a new address in address storage 63. In the absence of a signal at the output of monostable multivibrator 81, the first empty address determined by scanning comparator 69 causes an output from AND gate 79 which enables gate 77. The address stored in scanning counter 71 is therefore transferred into address storage 63 to constitute the new self-address. The self-address can thus be changed at regular time intervals, which also decreases the possibility of the transmission of any individual control unit being blocked because of overlapping of addresses.

A similar purpose is served by the delay stage 83 shown in FIG. 1, which delays the signal on line 13, namely the transmit enable signal, relative to the signal on line 39, namely the first enable signal. The delay furnished by stage 83 is inversely proportional to the self-address, that is a smaller delay will be interposed for self-addresses having high values than for self-addresses having low values. Individual control units having higher self-addresses can thus transmit in shorter time intervals than units having lower self-addresses. Gaps within the cycle can thus be filled in that the transmitting time of the transmitters having the higher address numbers is shifted to the transmitting time of the transmitters having the lower self-address numbers until the gap is closed. The cycle then shifts in accordance with the delay time which is assigned to the lowest self-address of the cycle.

If a further cycle is to be incorporated into the above described cycle, then the transmission times of the other cycle vary at a rate which differs from that of the first cycle since the lowest self-address of the one cycle is not equal to that of the other. Stage 83 thus causes a continual shifting relative to each other of the time at which the individual control units of the two cycles transmit, so that temporarily coinciding control signals of the two cycles are separated and can be recognized.

Details of delay stage 83 are shown in FIG. 4. Delay stage 83 comprises a pulse generator 103 (additional pulse generator means), an AND gate 101, and a counter 105. AND gate 101 has one input connected to pulse generator 103, a second input connected to a storage flip-flop 97 and an inverting input connected to the output of counter 105. As will be described in greater detail below, when flip-flop 97 is set, AND gate 101 is enabled. Pulses from pulse generator 103 pass to counter 105. As shown in FIG. 4, counter 105 has been preset to the self-address on lines 99 whose input is derived from storage 29 of FIG. 1. The pulses from pulse generator 103 are added to the preset number until counter 105 reaches a predetermined count which may for example, be the overflow count. The overflow signal generated by the counter constitutes the transmit enable signal and also blocks AND gate 101. The delay introduced between the furnishing of the transmit enable signal and the furnishing of first enable signal is inversely proportional to the number constituting the self-address, since fewer additional count are required for the counter to overflow when the preset number is high. Since the circuit is inactive while a control signal is being received from another individual control unit, the trailing edge of such a control signal can be used to reset the counter.

FIG. 4 also shows transmission control stage 83 and the "preferred transmission" stage 90 in greater detail. Stage 85 includes the circuitry required to block transmission of the transmitting stage 11 during reception by the receiving means of a control signal from another individual control unit. Control stage 85 also synchronizes the furnishing of the control signal to the furnishing of the transmit enable signal over a line 89. Preferred transmission stage 90 has the function to allow the transmission from the particular units to take place somewhat earlier than normally following the termination of the last received control signal. Since the first unit to transmit blocks the transmission from all other units, this slight advance in the transmission time causes the unit to take precedence over the others. This may for example be desired if due to overlapping of addresses or other causes the unit has not transmitted in the previous cycle.

The blocking signal from unit 25 is applied to a terminal 87 in FIG. 4 which sets a storage 91. When storage 91 is set, thereby indicating the absence of a received control signal, AND gate 95 is conductive and allows pulses from pulse signal generator 35 to be transmitted to its output. The function of a monostable multivibrator 93 whose time constant somewhat exceeds the duration of a control signal, is to reset flip-flop 91 if it has not been reset properly by the trailing edge of the control signal. The pulses counted in address counter 31 are compared by comparator 37 to the self-address supplied over line 99 from storage 29. When comparator 37 furnishes the first enable signal indicative of correspondence between the numbers stored in counter 31 and in the self-address, a storage flip-flop 97 is conditioned so that the next pulse received at its clock input will cause it to set. It should also be noted that address counter 31 advances by a count upon receipt of the leading edge of the pulses at the output of AND gate 95, while storage 97 is set by the trailing edge of these pulses. A delay of a time interval equal to the pulse width of the pulses at the output of AND gate 95 is therefore introduced between a furnishing of these pulses and a setting of storage flip-flop 97. The leading edge of the first enable signal sets a preferred transmission flip-flop 111 whose output is connected to one input of an AND gate 113 whose other input is connected to the output of AND gate 95. The output of AND gate 113 is connected to a set input of storage flip-flop 97. Since flip-flop 111 is set prior to the time of the trailing edge of the pulse output of AND gate 95, storage 97 is set at a slightly earlier time instant. The transmit enable signal is therefore furnished with a similar advance in time. The trailing edge of the control signal received by the unit is also utilized to reset flip-flops 97 and 111. How the output of flip-flop 97 is utilized to furnish the transmit enable signal was explained above.

Flip-flop 111 is set if the number of pulses furnished to counter 31 through gate 47 causes the number in the counter to be equal to the number in self-address storage 29. This indicates that the unit is being skipped in the sequence. FIG. 5 is a more detailed diagram of the control signal generator 9 of FIG. 1. Following the furnishing of the first enable signal, a flip-flop 117, is set. The "1" signal at the output of flip-flop 117 after processing in a stage 119 which will be described in greater detail below, furnishes the transmit enable signal to the transmitting stage 11. Further, it opens an AND gate 121 for transmission of pulses from a pulse generator 123. A counter 125 is connected to the output of AND gate 121. Counter 125 counts the pulses at the output of AND gate 121 and has predetermined counting outputs which control the operation of control signal generator 9. Counter 125 subdivides the control signal into sequential portions. It is reset to 0 at the end of the control signal. While container 125, starting at 0, counts k pulses, transmitting stage 11 is switched in and passes through its switching transient. From the k to the m counting pulse, the control signal generator 9 furnishes a synchronizing signal which is required for decoding of the address portion as well as of the command portion of the control signal in the receiving circuits of the other individual control units and of course in the receiving circuits of the objects to be controlled. The actual address portion is transmitted while counter 125 counts from the mth pulse to the nth. The counting outputs of counter 125 which signify the counts m to n are applied in parallel to a length control circuit 127 whose output resets flip-flop 117 and thus blocks AND gate 121 preventing further counts on the counter. Length control circuit 127 allows the width of the control pulses to be decreased under certain operating conditions. Such a decrease in the width of the control signal leads to a decrease in the complete cycle time as is immediately obvious by reference to FIG. *2a*. With shortened control signals a greater number of individual control units may be incorporated into a particular sequence without causing this sequence to exceed the maximum permissible cycle time. FIG. *2e* shows control signals of units 1, 2 and 8 which have been decreased in width. A shortening of the command portion of the control signal is, for example, possible if as shown in FIG. 5, a stage 131 is provided which responds to changes in the command and causes length control circuit 127 to shorten the command portion and thereby the complete control signal if the command remains the same. A single signal indicative that the width of the control signal may be shortened is sufficient for this purpose. A stage 133 is also provided which receives commands which have already been shortened in the input stage 17 (FIG. 1) and causes stage 127 to be set accordingly. Further, a stage 135 is provided which responds to emergency signals immediately. Such emergency signals are to cause the object controlled by the unit to be shut off immediately.

At this point an embodiment of the invention is to be discussed which is made possible by this shortening of the time required for one cycle. A random number generator (not shown) is utilized to switch an individual control signal into the sequence an additional time on a random bais. This signal is indicated with a K in FIG. *2f* and allows new individual transmitting units whose control signals at first overlapped that of the unit to be recognized and incorporated into the sequence.

The circuit of FIG. 5 also controls the generation of synchronizing signals in the control signal. These are required so that the receiving units in the objects and in the remaining individual control unit recognize the address and command portions of the control signal even when noise is present. Noise signals may for example be taken as address or command portions of the control signal by the various receiving circuit when a particular individual control unit is shut off. The control signals furnished by the control signal generator of FIG. 5 includes not only the address portions and the command portions in binary coded form but also synchronizing information composed of synchronizing signals which follow each other with equal interpulse intervals. Decoding of the control signals takes place in synchronism with the synchronizing signals, the first synchronizing signal in the control signal signifying the beginning thereof.

FIG. *7a* shows the timing diagram of a control signal wherein the address and command portions are shown in pulse form for better understanding. A pulse signifies a "1" bit and a missing pulse a "0" bit. The address or command portions are illustrated as bits Z1 to Z6 and my of course contain more bits. Synchronizing bits Y1 to Y3 precede bit Z1. The intervals between pulses Y1 to Y3 as wll as those between pulses Z1 to Z6 are all equal. However the interval between pulse Y3 and pulse Z1 is different. Noise bits which, by coincidence, occur at the same repetition frequency as the synchronizing signals are denoted by X1 and X2. Bits X1 and X2 would thus be interpreted as synchronizing bits y1 and Y2, but would not be considered part of either the address or the command.

FIG. 5 shows a circuit for generating synchronizing signals shown in FIG. *7a*. A flip-flop 139 is set by the k output of counter 125, that is after the counter has counted k pulses of pulse generator 123. Setting of flip-flop 139 opens an AND gate 141 whose output switches a monostable multivibrator 143 to the unstable state. The time constant of monostable multivibrator 143 is different from the period of pulse generator 123. Upon resetting, monostable multivibrator 143 sets a monostable multivibrator 145 whose time constant determines the width of pulses Y1 to Y3. Pulses Y1 to Y3 as generated by monostable multivibrator 145 are a part of one input of an OR gate 147, whose output is connected to the input of modulator 7. These pulses are thus modulated unto the carrier signal. Since transmitting stage 11 was activated when counter 125 was activated for counting the pulses from pulse generator 123, the pulses Y1 to Y3 are transmitted.

After counter 125 has counted m pulses flip-flop 139 is reset. A flip-flop 149 is set. When flip-flop 149 is set an AND gate 151 becomes conductive and transmits pulses from pulse generator 123 to a second input of OR gate 147. These pulses are therefore also applied to modulator 7 and transmitted.

A convertor 153 is preloaded with bits Z1 to Z6 of FIG. *7a*. The bits stored in convertor 153 are read out serially under control of the pulses at the output of AND gate 151. The Z1 bit is always a "1" bit. This is accomplished by a fixed potential applied to terminal 155 of convertor 153. The remaining Z bits are loaded into convertor 153 in parallel. The number of bits corresponds to the difference n minus m. Convertor 153 as well as flip-flop 149 are reset at the end of the control signal by a signal from length control circuit 127 applied through a line 159.

The transmit energizing stage 119 in FIG. 5 serves solely to apply and shut off the operating voltage for transmit stage 11. The operating voltages for carrier signal generator 5 and modulator 7 are applied even when stage 11 is shut off since these circuits have a particularly long warm-up time. The time interval from o to k on counter 125 is utilized by transmit energizing stage 119 to apply the operating voltage to transmit stage 11 in the form of a ramp function shown in FIG. 8. A time $t_1$ corresponds to the time k, t, h pulse is counted, that is full operating voltage has been applied to stage 11 at this time.

FIG. 6 is a block diagram of the circuits in the receivers of the object and in the receiving means 1 of FIG. 1 which are required in order to synchronize the operation of the transmitting and receiving circuit. A synchronizing signal generator 161 furnishes pulses to a counter 165. Counter 165 continuously counts the synchronizing pulses and is reset after counting the number of pulses corresponding to the number of pulses within one period. Eight pulses are contained in one period in the example to be discussed. Correspondingly, the counter has eight outputs, sets a flip-flop 163 with its "7" output and resets this flip-flop with its "1" output. Flip-flop 163 therefore furnishes a "1" signal while the counter counts from "7" to "1". The "1" output signal of flip-flop 163 forms a window whose center is determined by the "0" position of counter 165. "0" signal of counter 65 also serves as a synchronizing signal for reading information from demodulator 171 into a convertor 169. Demodulator 171 is connected to a receiving stage 21. The signals received in receiving stage 21, after demodulation by demodulator 171, are read serially into convertor 169 under the control of the "0" signals from counter 165. The data which was serially entered into convertor 169 is read out in parallel on lines 173 in response to an output signal furnished on line 177. Counter 175 counts bits Z1 to Z6. In order to resynchronize the above described circuits for each pulse furnished by demodulator 171, the output of flip-flop 163 is connected to the inverting input of an AND gate 179. AND gate 179 is therefore conductive for pulses for "1" pulses from demodulator 171. The pulses at the output of AND gate 179 are applied through a line 181 to the reset inputs of counters 165 and 175. Counter 175 begins to count in the center of the window and, after resetting, must count the number of bits in the control signal before causing the information in convertor 169 to be read out in parallel in response to the output signal on line 177.

FIG. 6, also includes in a more detailed block diagram of receiving means 1 of FIG. 1. The receiver stage 21 is connected to a field strength measuring circuit 183 whose output is in turn connected to a threshold stage 185. The field strength measuring circuit measures the strength of the received high frequency field. The threshold stage determines whether the level of this field is above a predetermined level, the predetermined level being determined by the field strength which would cause interference at a receiver. If the threshold stage determines that such is the case, it furnishes a threshold output signal to one input of an AND gate 187 whose other input is connected to the output of AND gate 179. The pulses at the output of AND gate 187, which must be assumed to come from another individual control unit, are applied to an indicator 189. A filter may be interposed between AND gate 187 and indicator 189 in order to prevent individual noise pulses which may fall outside of the window to be indicated as a signal received from another individual control unit. A further indication as to whether transmission from another unit is being received is the output signal at a predetermined output 191 of counter 175. The count on counter 175 signified by terminal 191 precedes the count which causes the signal to be furnished on line 177 which reads the information from convertor 169. The output 191 is so chosen that the count it represents will not be reached by noise pulses which accidentally occur at the same repetition frequency as the synchronizing signals. While the signal at the output of threshold stage 185 causes, as explained above, a limiting of the region within signals are being received, the signal at the output 191 of counter 125 is independent of the received field strength.

From the above, it can be seen that received synchronizing signals must fall within the window generated by counter 165 in order to be recognized as synchronizing signals. The "window" generated by counter 165 is resynchronized by each received synchronizing signal which falls outside of the window. Each synchronizing signal which is received outside of the window therefore forms a reference point for the following window. This property of the circuit allows an unequivocable identification of the start of the control signal and thereby allows perfect identification of the address and command portions in the control signal. The first synchronizing signal of the address or command portion of the control signal follows the last previous synchronizing signal at a repetition frequency which is either less than or greater than the repetition frequency of the previous synchronizing signals. The window circuits in the receivers synchronize not only to the synchronizing signals which are furnished first but also to the first synchronizing signal contained in the address portion or the command portion. If the transmitter is activated, it is therefore impossible for the receiver to mistake noise signals for synchronizing signals while receiving the actual address portion.

FIG. *7b* illustrates how each Z1 bit, which is always a "1", resynchronizes the window circuit.

FIG. 9 shows a block diagram of a monitoring circuit for the individual control units. This is particularly important since the units are individually operated in sequence, that is in multiplex fashion, and therefore any individual control unit which transmits continually causes the signals from the other control units to be blocked. A high frequency detector is therefore connected to the output of transmitting stage 11. Detector 193 responds to the high frequency generated by transmitting stage 11 and sets a timing circuit 197 which, after expiration of its time constant deactivates the individual control unit and furnishes an indication on a malfunction indicator 199. The timing circuit 197 is reset by high frequency detector 193 when the reception of the carrier signal is terminated. In an analogous fashion, the equipment can also be monitored to detect a case where the individual control unit fails to furnish its control signal. For this, the output of the high frequency detector 193 is applied to a timing circuit 201 through an inverting input. After expiration of its time constant, an indication is furnished on the malfunction indicator 199 that the individual control unit is not transmitting at all. Again, timing circuit 201 is reset when high frequency detector 193 starts to detect a high frequency signal. The time constants of timing circuits 197 and 201 are longer than the greatest cycle time to be expected.

The command portion of the control signal is applied to modulator 7 from command input stage 17 through a converter 203. It is also possible that the converter receives the address portion of the control signal. Receiving stage 21, which is coupled to selector switch 3, furnishes the received control signals to a demodulator 205 which demodulates the high frequency carrier and furnishes the demodulated control signals to a convertor 207. A damping circuit 209 is connected in parallel to a selector switch 3 so that the control signal transmitted by transmitting stage 11 can be directly applied to the receiving stage 21. To determine whether the individual control unit is functioning correctly, converters 203 and 207 both have outputs connected to a comparator 211. Comparator 211 thus compares the signal furnished by converter 203 to the control signal received by converter 207. If the two signals are unequal, comparator 211 deactivates the individual control unit and furnishes an indication of this deactivation on the malfunction indicator 199.

Many operating conditions which may lead to malfunction of the individual control unit may be determined sufficiently early so that the controlled object may be deactivated while the individual control unit assigned to it is still operating correctly. For example, the charge on the battery 213 which supplied the energy for the circuit may be monitered by means of a threshold stage 215. If the amplitude of voltage furnished by battery 213 exceeds the threshold voltage of threshold stage 215, the latter furnishes a threshold output signal to storage 217, which in a preferred embodiment is a flip-flop, and whose output enables the circuit which supplies the operating voltage to transmitting stage 11. If, however, the voltage is below the threshold value, a signal indicating this condition is stored in a storage 219. The signal in storage 219 prevents reactivation of the control unit even if battery 213 should recover in the interval between transmissions. Flip-flop 219, once set, causes an AND gate 221 to be conductive. The AND gate then transmits pulses from a pulse generator 223 to an indicator 225 and a signal on indicator 225 indicates that battery 213 must be replaced. A counter 227 is connected to the output of AND gate 221. The counter counts the pulses furnished by pulse generator 23 and, when a predetermined count on the counter is reached, activates a stage 229 which furnishes an emergency signal to convertor 203. The emergency signal is transmitted with the next control signal and causes the associated object to be deactivated. The count of counter 227 which results in the furnishing of the emergency signal is so chosen that time remains to complete the last steps in the series of commands given the object before the emergency signal is transmitted. After counter 227 reaches a second predetermined count, it deactivates the complete individual control unit by means of a deactivating stage 231.

While the invention has been illustrated in preferred embodiments, it is not to be limited to circuits and structures shown, since many variations thereof will be evident to one skilled in the art and are intended to be encompassed in the present invention as set forth in the following claims.

I claim:

1. Apparatus for furnishing control signals in a predetermined sequence to a plurality of controllable objects, said apparatus comprising a plurality of individual control units, each for furnishing a control signal to a corresponding one of said objects, each control signal comprising a self-address signal signifying the position in said predetermined sequence of said control signal and a command portion specifying the operation to be carried out by the controlled object, each of said individual control units comprising, in combination, first storage means for storing said self-address signal thereby furnishing a stored self-address signal; receiving means for receiving control signals transmitted by the others of said individual control units, furnishing a blocking signal indicative of the presence of a received control signal, and detecting the address in said control signal and furnishing a corresponding external address signal; second storage means connected to said receiving means for storing said external address signal, thereby furnishing a stored external address signal; timing means connected to said receiving means for furnishing a sequence of timing signals starting at a predetermined time instant following termination of reception of said control signal; enable means connected to said first and second storage means and said timing means for receiving said timing signals, and furnishing said transmit enable signal when the number of received timing signals corresponds to the difference between said stored external address signal and said stored self-address signal; and blocking means for blocking the furnishing of said transmit enable signal in response to said blocking signal, whereby transmission from all except the first enabled one of said individual control units following termination of reception of the previous control signal is blocked.

2. Apparatus as set forth in claim 1, wherein said enable means comprises address modifying means connected to said timing means and said second storage means, for modifying said stored external address signal in response to said timing signals and furnishing said transmit enable signal upon correspondence between the so-modified external address signal and said self-address signal.

3. Apparatus as set forth in claim 2, wherein said self-address is a number, the value of each number being indicative of the position of said control signal in said sequence of control signals; wherein said timing means comprises pulse generator means for furnishing a sequence of timing pulses at a frequency substantially exceeding the rate of transmission of said control signals; wherein said address modifying means comprises adder means for adding said timing pulses to said stored external address signal thereby furnishing a modified external address signal, and comparator means, interconnected between said first storage means and said adding means, for comparing said modified external address signal to said stored self-address signal and furnishing said transmit enable signal following correspondence there-between.

4. Apparatus as set forth in claim 3, wherein said blocking means comprises first gating means interconnected between said pulse generator means and said adding means for blocking the transmission of said pulses to said adding means in the presence of a received control signal.

5. Apparatus as set forth in claim 2, further comprising transmit gating means interconnected between said address modifying means and said transmitting means, for blocking the furnishing of said transmit enable signal for a predetermined time interval following transmission of a control signal by said transmitting means.

6. Apparatus as set forth in claim 5, further comprising override circuit means connected to said transmit gating means for furnishing an override signal for overriding the blocking of said transmit enable signal in response to external activation.

7. Apparatus as set forth in claim 3, wherein each of said control signal extends over a control signal time interval; further comprising transmit delay means interconnected between said comparator means and said transmitting means, for delaying the furnishing of said transmit enable signal to said transmitting means for a transmit delay time short relative to said control signal time interval, and transmit delay modifying means connected to said transmit delay means, for decreasing said transmit delay time thereby allowing preferential transmission if said transmitting means did not operate during the previous sequence of said control signals.

8. Apparatus as set forth in claim 7, wherein said transmit delay means comprises a bistable circuit adapted to furnish said transmit enable signal when in a SET state, and normally switched to said SET state by the trailing edge of the timing pulse immediately following correspondence between said modified external address signal and said self-address signal; and wherein said transmit delay modifying means comprises circuit means connected to said bistable circuit, for switching said bistable circuit to said SET state by the leading rather than the trailing edge of said timing pulse.

9. Apparatus as set forth in claim 3, wherein said comparator means furnishes a first enable signal when said external address signal corresponds to said stored self-address signal; further comprising output delay means connected to said comparator means for furnishing said transmit enable signal to said transmitting means an address-dependent delay time following the furnishing of said first enable signal.

10. Apparatus as set forth in claim 9, wherein said address-dependent delay time varies inversely with the position in said predetermined sequence of the associated one of said control signals.

11. Apparatus as set forth in claim 10, wherein said output delay means comprises counting means having a counting input, means for presetting said counting means to said self-address, additional pulse generator means for furnishing an additional pulse sequence, and gating means for applying pulses from said additional pulse sequence to said counting means in response to said first enable signal and until the count or said counting means is a predetermined count; and wherein said transmit enable signal is furnished in response to said predetermined count.

12. Apparatus as set forth in claim 2, further comprising random number signal generating means for generating random numbers; and additional transmission circuit means interconnected between said random number generating means and said transmitting means for furnishing an additional transmit enable signal to said transmitting means following a randomly selected one of said control signals in said sequence of control signals.

13. Apparatus as set forth in claim 2, wherein said receiving means further comprises threshold circuit means for furnishing a threshold output signal only when the field strength of the received control signal exceeds a predetermined field strength; and wherein said blocking means is operative only in response to said threshold output signal.

14. Apparatus as set forth in claim 2, wherein said address portion of said control signal comprises a fixed address constituting the address of the object to be controlled by said control signal, and a variable address constituting said self-address; further comprising, address control means connected to said first storage means for selecting a new address and storing said new address in said first storage means thereby furnishing a new self-address signals; and control signal generator means connected to said first storage means and responsive to said new self-address signals, for changing said address portion of said control signal to correspond thereto.

15. Apparatus as set forth in claim 14, wherein said address control means comprises decoder means connected to said receiving means for receiving said external address signals and furnishing corresponding decoder output signals, each of said decoder output signals signifying an occupied address; storing means for storing said decoder output signals, thereby furnishing stored decoder output signals; scanning means for scanning said storing means and furnishing an empty position signal in response to the absence of a decoder output signal in one of said storing means; new address storage means; and gating means interconnected between said scanning means and said new address storage means, for transferring the address corresponding to the storing means signified by said empty position signal to said new address storage means, the number stored in said new address storage means constituting the new self-address.

16. Apparatus as set forth in claim 15, wherein each of said storing means comprises a monostable multivibrator having a predetermined time constant, whereby storage of a decoder output signal is automatically terminated a predetermined time interval following receipt of the corresponding one of said external addresses.

17. Apparatus as set forth in claim 16, wherein said predetermined time constant covers a plurality of cycles of said sequence of control signals.

18. Apparatus as set forth in claim 15, further comprises random number generator means; and switching means for connecting said random number generating means to said new address storage means in the absence of any stored decoder output signal.

19. Apparatus as set forth in claim 17, further comprising address change inhibiting means connected to said new address storage means, for inhibiting the changing of the address in said new address storage means for a predetermined time interval following each address change.

20. Apparatus as set forth in claim 2, further comprising transmit synchronizing means connected to each of said transmitting means for adding synchronizing signals to said control signal; and wherein said receiving means comprises receiver synchronizing means for separating said synchronizing signals from received control signals thereby furnishing received synchronizing signals, and means for furnishing said external address signal under control of said received synchronizing signals.

21. Apparatus as set forth in claim 20, wherein said transmit synchronizing means comprises transmit pulse generator means for furnishing synchronizing signals, means for enabling said transmit pulse generator means in response to said transmit enable signal, counting means for counting said synchronizing signals and furnishing synchronizing count signals corresponding to the so-counted number of synchronizing signals, pulse shaping means connected to said counting means and said transmit pulse generator means for shaping a predetermined number of said first synchronizing signals following a first predetermined one of said synchronizing count signals, and means for applying the so-shaped pulses to said modulator means to constitute said synchronizing signals.

22. Apparatus as set forth in claim 21, further comprising parallel-series convertor means storing said control signal and adapted to furnish signals constituting said control signal in series under control of readout pulses; and wherein said transmit synchronizing means comprises means responsive to a second selected one of said synchronizing count signals for furnishing readout signals at the same repetition frequency as said synchronizing signals to said parallel-series convertor means.

23. Apparatus as set forth in claim 22, further comprising delay means interposed between said pulse shaping means and said counting means; and wherein said readout pulses follow said second selected one of said synchronizing counts signals substantially without delay, whereby the interval between the last of said synchronizing pulses and the first signal read from said parallel-series convertor means differs from the interval between consecutive ones of said synchronizing signals.

24. Apparatus as set forth in claim 21, further comprising length control circuit means connected to said counting means for controlling the width of said control signals in dependence upon the absence or presence of command changes.

25. Apparatus as set forth in claim 23, wherein said receiving means comprises free-running gating means for furnishing a gating signal at a repetition frequency equal to the repetition frequency of the transmitted synchronizing signals; wherein said receiving means comprises means for separating synchronizing signals from said control signal, thereby furnishing separated synchronizing signals; further comprising means for synchronizing said free-running gating means to said received synchronizing signals, and series-parallel convertor means connected to said gating means and said receiving means for receiving said control signal under the control of said gating signals.

26. Apparatus as set forth in claim 24, wherein said gating means comprises gating counter means, and pulse generator means connected to said gating counter means for furnishing a sequence of pulses thereto; and wherein said means for synchronizing said gating means to said received synchronizing signals comprises means for resetting said counting means by the first received synchronizing signal following a predetermined count on said gating counter means.

27. Apparatus as set forth in claim 25, wherein said predetermined count is the highest count, said highest count occurring immediately preceding the start of the next received synchronizing signal when said receiving means is synchronized to said transmitting means.

28. Apparatus as set forth in claim 26, further comprising address and command signal counting means connected to said gating counter means for counting overflow signals from said gating counter means and furnishing an address counting output signal for transferring information from said series-parallel convertor means to said second storage means when the number of signals counted thereby corresponds to the number of signals constituting said control signal.

* * * * *